No. 731,430. PATENTED JUNE 23, 1903.
C. C. CHESNEY & W. J. LLOYD.
ALTERNATING CURRENT REGULATOR.
APPLICATION FILED JULY 18, 1902.
NO MODEL.

Witnesses
CUMMINGS C. CHESNEY
WILLIAM J. LLOYD Inventors
By their Attorney

No. 731,430. Patented June 23, 1903.

UNITED STATES PATENT OFFICE.

CUMMINGS C. CHESNEY AND WILLIAM J. LLOYD, OF PITTSFIELD, MASSACHUSETTS.

ALTERNATING-CURRENT REGULATOR.

SPECIFICATION forming part of Letters Patent No. 731,430, dated June 23, 1903.

Application filed July 18, 1902. Serial No. 116,013. (No model.)

*To all whom it may concern:*

Be it known that we, CUMMINGS C. CHESNEY and WILLIAM J. LLOYD, citizens of the United States, residing at Pittsfield, Berkshire county, Massachusetts, have invented certain new and useful Improvements in Alternating-Current Regulators, of which the following is a full, clear, and exact description.

Our invention relates to improvements in alternating-current regulators, and has for its object to produce an efficient apparatus for regulating the current-flow in an alternating-current circuit, being particularly intended for use with arc-lights or incandescent lights when run in series from a constant-potential source of supply.

By the use of this apparatus the current can be maintained substantially constant in a branch supplied from a constant-potential source, although said branch contains a varying load of lamps in series.

The following is a description of an apparatus embodying our invention, reference being had to the accompanying drawings, in which—

Figure 1:
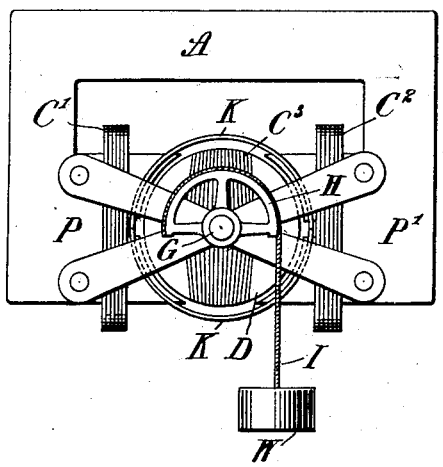
Figure 2:
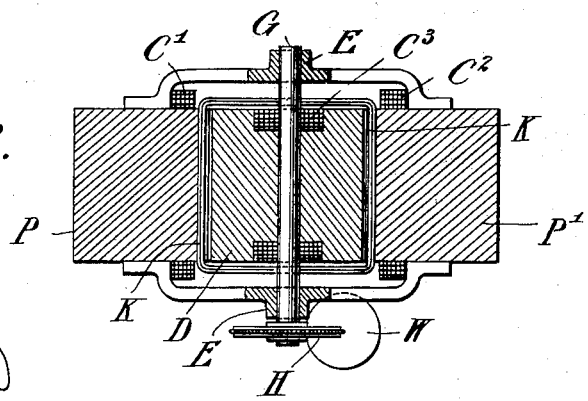
Figure 4:
Figure 3:
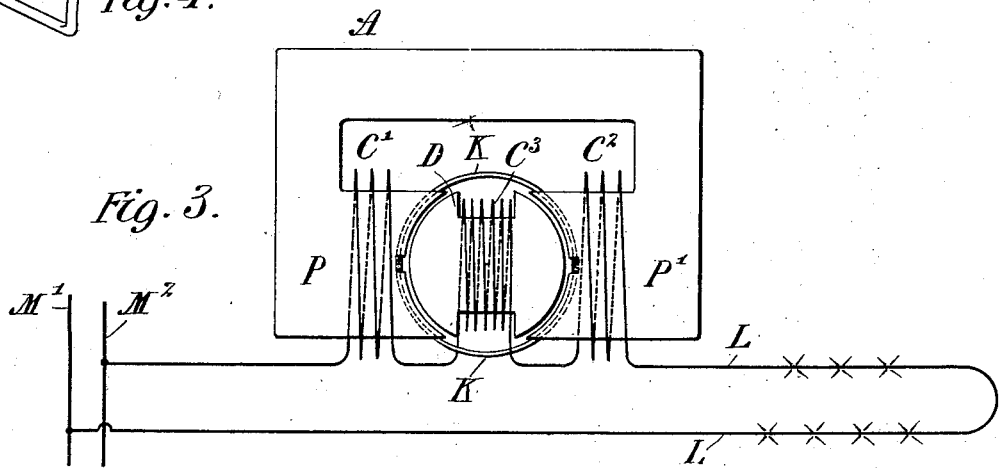

Figure 1 shows it in side elevation. Fig. 2 is a horizontal section of the apparatus. Fig. 3 shows the wiring and connections. Fig. 4 shows a detail in perspective.

Referring more particularly to the drawings, A represents a magnetic circuit having polar projections P P', about which are coils $C'$ $C^2$. Within the polar projections P P' is a magnetic core D, mounted in the bearings E so as to revolve between the pole-pieces P P'. This core D is in the form of a shuttle-armature and has upon it the coil $C^3$, which, as shown in Fig. 3, is in series with the coils $C'$ $C^2$ and has a number of turns equal to the sum of the turns in those two coils. Upon the shaft G of the core D is mounted a sector H, over which passes a rope I, connected to a weight W. The pole-pieces P P' have slots in their faces, in which lie coils K, which are windings closed upon themselves, so as to form closed conducting-circuits. These windings being in a plane parallel to the lines of force due to the coils $C'$ $C^2$ are not affected thereby, except by leakage therefrom, but are affected by the lines of force due to the current in the coil $C^3$ when that coil is turned so as not to be at right angles to the line joining the polar centers. In the form shown the coils $C'$, $C^2$, and $C^3$ are in series with one another and are also in series with the lamp-circuit L L, supplied with the current from the constant-potential mains $M'$ $M^2$.

The instrument controls the amount of current flowing to the lamp-circuit L L by varying the amount of inductance in the circuits. With the parts in the position shown in the drawings the inductance is greatest, since it depends on the number of lines of force threading the winding, and it is evident that the greatest number of lines will thread the windings when they are all generating lines of force in the same direction. In the operation of the apparatus the movable magnet tends to arrange itself so that the lines of force will have the shortest direct path from one pole to another of opposite character. The core D, therefore, tends to set itself in the position shown in Figs. 1 and 3, which tendency is to a certain extent counterbalanced by the weight W. If the load in the circuit is such that the parts assume the position shown and additional resistance or inductance is inserted at L L, the current-flow tends to fall, due to the increased resistance or inductance. This lessens the lines of force to be generated in the regulator by the coils $C'$, $C^2$, and $C^3$, and consequently lessens the force, tending to hold the core in the position shown. Immediately the weight W descends, rotating the armature D. The rotation of the armature D decreases the number of lines of force threading the coils $C'$ $C^2$ $C^3$, thereby reducing the inductance in the circuit due to the action of these coils, thus allowing more current to flow through the regulator and through the circuit L L. In this way with the inductance and magnetic attraction working against each other and by the selection of a suitable controlling force, such as a weight W, the current can be maintained constant in the lamp-circuit L L, or by suitable adjustments the current can be made to assume any desired value for any fixed condition of the circuit L L or varied independently. When the circuit L L is loaded to the maximum value, the armature D would be rotated through one hundred and eighty degrees. In this position the flux due to the coil $C^3$ would neutralize the flux due to the coils $C'$ and $C^2$ and the regulator would have no inductance and would therefore offer practically no resistance to the flow of the current. In order to get the highest efficiency at full load, the short-circuited coils K are embedded in the polar faces and arranged at right angles to the main stationary coil $C'$ $C^2$. These coils K are shown in position in slots in the polar faces. The operation of these coils is as follows: When the armature is in the position shown in Fig. 1, the lines of force have a straight path through the iron, and the coils K K in effect are parallel with the lines of force, and consequently no electromotive force is set up in them and there is no flow of current therein. When, however, the armature is rotated from the position shown in the figures, the lines of force generated by the coil $C^3$ cuts the short-circuited coils K, causing the currents to flow therein, thus neutralizing the self-induction of the movable coil $C^3$. The maximum effect occurs when the armature is moved ninety degrees from the position shown in the figures. When the armature is rotated one hundred and eighty degrees from the position shown, the current flowing through the movable coil $C^3$ is exactly opposed to the current flowing through the stationary coils $C'$ $C^2$. The normal tendency is to drive the lines of force out at the edge of the field, causing what is generally understood as a stray field. This stray field causes local self-induction in both the stationary and the movable coils $C'$ $C^2$ $C^3$ and these lessen the output of the regulator. The short-circuited coils, however, are in the position so as to counteract the effect of this stray field. The stray field cuts the short-circuited coils K, causing the currents to flow therein, which neutralizes the local self-induction.

Our invention is capable of being embodied in various forms of apparatus, and we do not, therefore, intend to limit it to the precise embodiment shown.

What we claim is—

1. In a regulator, in combination, a magnetic circuit, consisting of a fixed and a movable member, windings on both of said members supplied from the same alternating-current source, and a closed circuit fixed relatively to one member and in a plane parallel to the lines of force due to the windings thereon.

2. In a regulator, in combination, a magnetic circuit consisting of a fixed and a movable member, windings on one member in series with and substantially equal to those of the other, and means tending to overcome the attraction of the current in the windings of one member for the current in the other windings, and a closed circuit fixed relatively to one of said members and parallel to the lines of force due to the windings thereon.

3. In a regulator, in combination, a cylindrical core, a second core embracing said cylindrical core, the two cores being relatively movable, windings on each of said cores in inductive relation to each other, means tending to overcome the attraction of the currents in said windings, and a closed conducting-circuit fixed in non-inductive relation to the winding on said second core.

4. In a regulator, in combination, a stationary magnetic member having polar projections and winding thereon, a movable magnetic member between said pole-pieces, a winding thereon, said winding being supplied from the same source, means tending to overcome the attraction of said windings, and a closed circuited winding lying across the faces of said pole-pieces in a plane parallel to the axis of rotation of the movable member.

Signed at Pittsfield, Massachusetts, this 15th day of July, 1902.

CUMMINGS C. CHESNEY.
WILLIAM J. LLOYD.

Witnesses:
  C. F. ADAMS,
  R. W. POWER.